United States Patent [19]

Sugiyama

[11] Patent Number: 5,311,956
[45] Date of Patent: May 17, 1994

[54] ELECTRIC CONTROL APPARATUS FOR REAR WHEEL STEERING MECHANISM OF WHEELED VEHICLE

[75] Inventor: Mizuho Sugiyama, Toyota, Japan

[73] Assignee: Toyota Jidosha Kabushiki Kaisha, Toyota, Japan

[21] Appl. No.: 974,421

[22] Filed: Nov. 12, 1992

[30] Foreign Application Priority Data

Nov. 13, 1991 [JP] Japan .................................. 3-297479

[51] Int. Cl.$^5$ .............................................. B62D 6/00
[52] U.S. Cl. ..................................... 180/140; 180/142; 364/424.05
[58] Field of Search ............... 180/140, 142, 141, 79.1; 280/91; 364/424.05

[56] References Cited

U.S. PATENT DOCUMENTS

| | | | |
|---|---|---|---|
| 3,958,656 | 3/1976 | Niemann | 180/79.1 |
| 4,597,462 | 7/1986 | Sano et al. | 180/140 |
| 4,679,808 | 7/1987 | Ito et al. | 280/91 |
| 4,872,116 | 10/1989 | Ito et al. | 180/142 |
| 5,180,026 | 1/1993 | Mori | 180/140 |
| 5,227,974 | 7/1993 | Tomoda et al. | 180/140 X |

FOREIGN PATENT DOCUMENTS 63-207772 8/1988 Japan .
63-270283 11/1988 Japan .

Primary Examiner—Margaret A. Focarino
Assistant Examiner—Victor E. Johnson
Attorney, Agent, or Firm—Cushman, Darby & Cushman

[57] ABSTRACT

An electric control apparatus for a rear wheel steering mechanism in a four-wheel steering system of a wheeled vehicle is designed to detect a yaw rate of the vehicle body for determining a target steering amount for steering a set of dirigible rear road wheels in accordance with a magnitude of the detected yaw rate in a direction restraining the yaw rate of the vehicle body and to produce a control signal indicative of the target steering amount for applying it to an electrically operated actuator of the rear wheel steering mechanism. The electric control apparatus is further designed to detect a roll angle and/or a roll angle speed of the vehicle body and to determine a correction amount for steering the rear road wheels in accordance with a magnitude of the detected roll angle and/or roll angle speed in an opposite direction relative to the direction restraining the yaw rate of the vehicle body and adding the correction amount to the target steering amount.

3 Claims, 6 Drawing Sheets

ELECTRIC CONTROL APPARATUS FOR REAR WHEEL STEERING MECHANISM OF WHEELED VEHICLE

BACKGROUND OF THE INVENTION

1. Field of the Invention

The present invention relates to a four-wheel steering system of a wheeled vehicle, more particularly to an electric control apparatus for a rear-wheel steering mechanism for controlling steerage of a set of dirigible rear road wheels in accordance with a yaw rate of the vehicle body.

2. Discussion of the Prior Art

In Japanese Patent Laid-open Publication No. 63-207772, there has been proposed an electric control apparatus of this kind which is designed to detect a yaw rate of the wheeled vehicle for determining a target steering amount for steering the rear road wheels in accordance with a magnitude of the detected yaw rate in a direction restraining the yaw rate of the vehicle and to produce a control signal indicative of the target steering amount for applying the control signal to an electrically operated actuator of the rear wheel steering mechanism. With such a conventional control apparatus, the yaw rate during turning of the vehicle converges as shown by two-dot chain lines in FIG. 5 of the present application to enhance the running stability of the vehicle. Under control of the conventional control apparatus, however, the rear road wheels are steered in response to the detected yaw rate of the vehicle body. As a result, the cornering force of the rear road wheels rapidly rises to shorten a transition period for turning of the vehicle, and as shown by the two-dot chain lines in FIG. 5, a rise rate of lateral acceleration of the vehicle body becomes steep, resulting in an increase of the roll angle speed of the vehicle body.

SUMMARY OF THE INVENTION

It is, therefore, a primary object of the present invention to provide an improved electric control apparatus for the rear wheel steering mechanism capable of improving the riding comfort of the wheeled vehicle without causing any deterioration of the yaw rate convergency characteristic obtained by the conventional control apparatus.

According to the present invention, the object is accomplished by providing an electric control apparatus for a rear wheel steering mechanism in a four-wheel steering system of a wheeled vehicle, the rear wheel steering mechanism having an electrically operated actuator arranged to steer a set of dirigible rear road wheels in response to an electric control signal applied thereto, the electric control apparatus comprising means for detecting a yaw rate of the vehicle body, means for determining a target steering amount for steering the rear road wheels in accordance with a magnitude of the detected yaw rate in a direction restraining the yaw rate of the vehicle body, and means for producing a control signal indicative of the target steering amount and applying the control signal to the electrically operated actuator, wherein the electric control apparatus further comprises means for detecting a roll angle and/or a roll angle speed of the vehicle body, and correction means for determining a correction amount for steering the rear road wheels in accordance with a magnitude of the detected roll angle and/or roll angle speed in an opposite direction relative to the direction restraining the yaw rate of the vehicle body and adding the correction amount to the target steering amount.

BRIEF DESCRIPTION OF THE DRAWINGS

Additional objects, features and advantages of the present invention will be more readily appreciated from the following detailed description of a preferred embodiment thereof when considered with reference to the accompanying drawing, in which.

DESCRIPTION OF THE PREFERRED EMBODIMENT

Figure 1:
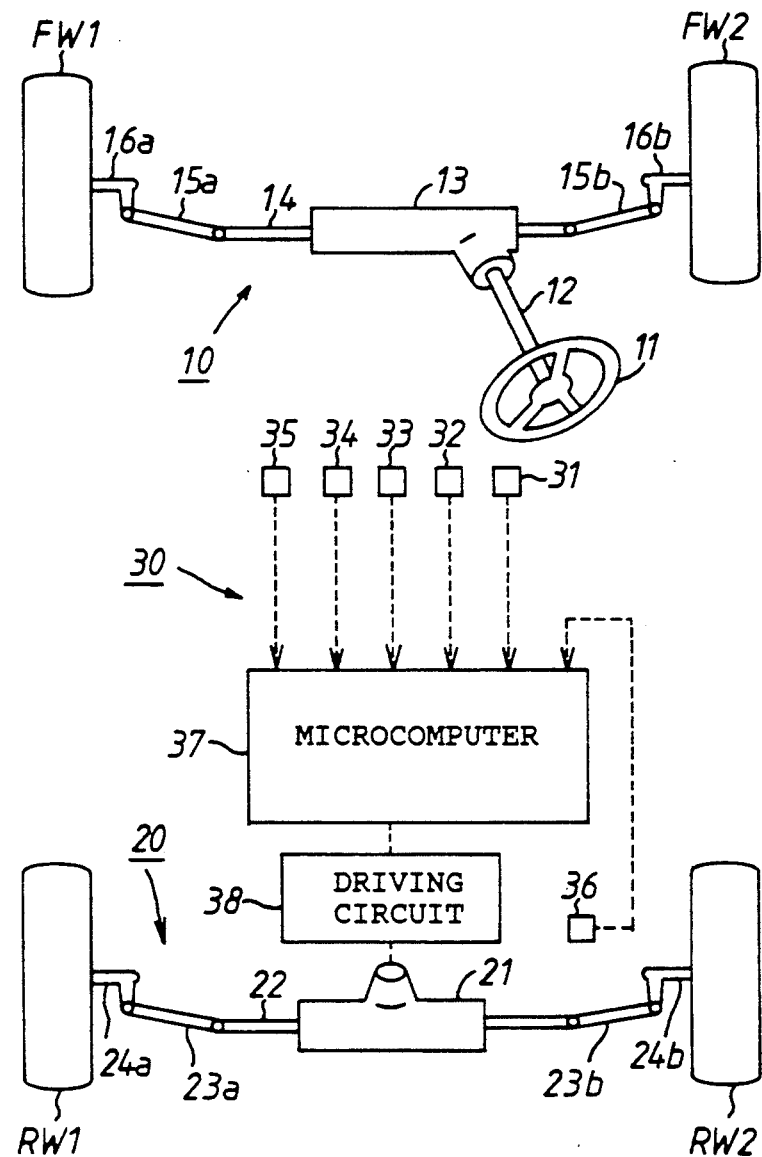
FIG. 1 is a schematic illustration of a four-wheel steering system of a wheeled vehicle.

In FIG. 1 of the drawings, there is illustrated a four-wheel steering system of a wheeled vehicle which comprises a front wheel steering mechanism 10 for a set of dirigible front road wheels FW1, FW2, a rear wheel steering mechanism 20 for a set of dirigible rear road wheels RW1, RW2, and an electric control apparatus for the rear wheel steering mechanism 20. The front wheel steering mechanism 10 includes a steering wheel 11 mounted on a steering shaft 12 the lower end of which is operatively connected to a rack bar 14 mounted for axial displacement within a steering gear box 13. The rack bar 14 is connected at its opposite ends to the front road wheels FW1, FW2 through a pair of tie rods 15a, 15b and a pair of knuckle arms 16a, 16b. Thus, the front road wheels FW1, FW2 are steered in accordance with axial displacement of the rack bar 14. The rear wheel steering mechanism 20 includes an electrically operated actuator 21 which is arranged to effect axial displacement of a relay rod 22 in response to an electric control signal applied thereto. The relay rod 22 is connected at its opposite ends to the rear road wheels RW1, RW2 through a pair of tie rods 23a, 23b and a pair of knuckle arms 24a, 24b. Thus, the rear road wheels RW1, RW2 are steered in accordance with axial displacement of the relay rod 22.

Figure 2:
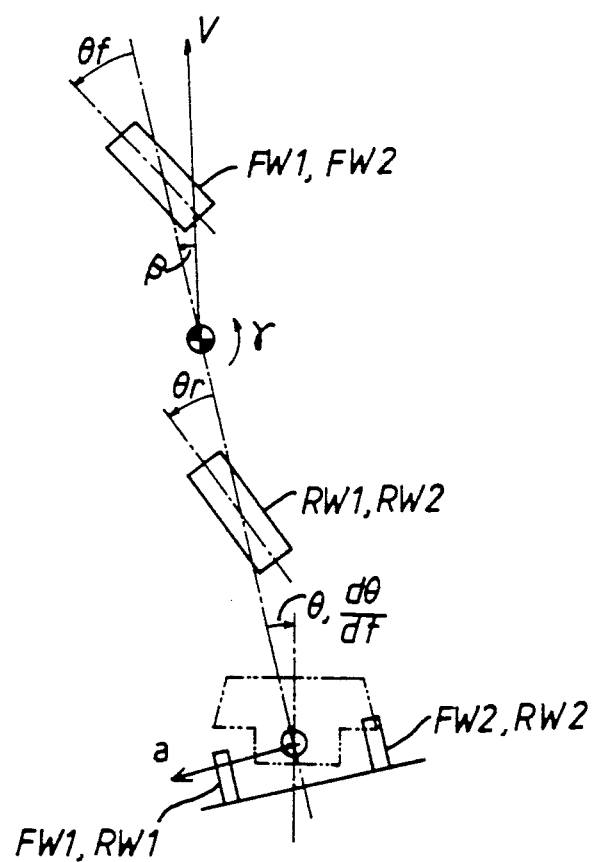
FIG. 2 is a notional view showing each condition amount of the wheeled vehicle for explanation of positive or negative values detected by respective sensors shown in FIG. 1.

The electric control apparatus 30 includes a vehicle speed sensor 31, a slip angle sensor 32, a yaw rate sensor 33, a roll angle speed sensor 34, a roll angle sensor 35 and a rear wheel steering angle sensor 36. The vehicle speed sensor 31 is arranged to detect a rotational speed of an output shaft of the vehicle power transmission (not shown) for producing an electric signal indicative of a travel speed V of the vehicle. The slip angle sensor 32 is arranged to detect a deviation angle of the vehicle body with respect to a forward direction of the vehicle for producing an electric signal indicative of a slip angle $\beta$ of the vehicle body. The yaw rate sensor 33 is arranged to detect a rotational angle speed of the vehicle body about a vertical axis for producing an electric signal indicative of a yaw rate $\gamma$ of the vehicle body. The roll angle speed sensor 34 is arranged to detect a rotational angle speed of the vehicle body about a fore-and-aft axis of the vehicle for producing an electric signal indicative of a roll angle speed $d\theta/dt$ of the vehicle. The roll angle sensor 35 is arranged to detect a rotational angle of the vehicle body about the fore-and-aft axis of the vehicle for producing an electric signal indicative of a roll angle $\theta$ of the vehicle body. The rear wheel steering angle sensor 36 is arranged to detect a steering angle of the rear road wheels RW1, RW2 for producing an electric signal indicative of the detected steering angle $\theta r$. In this embodiment, the slip angle $\beta$, yaw rate $\gamma$, roll angle speed $d\theta/dt$, roll angle $\theta$ and rear wheel steering angle $\theta r$ each are represented as a positive value in a direction shown by an arrow in FIG. 2.

The electric control apparatus includes a microcomputer 37 arranged to be applied with the electric signals from the sensors 31-36. The microcomputer 37 is composed of a central processing unit or CPU, a read-only memory or ROM, a random access memory or RAM and an input/output device or I/O. The ROM is designed to memorize a control program shown by a flow chart in FIG. 3 and to memorize various coefficients $K_1(V)$, $K_2(V)$, $K_3(V)$, $K_4(V)$ respectively as a function of the vehicle speed V in the form of tables shown in FIG. 4. The computer 37 is connected to a driving circuit 38 which is arranged to drive the actuator 21 in accordance with an electric control signal applied thereto from the computer 37.

Figure 3:
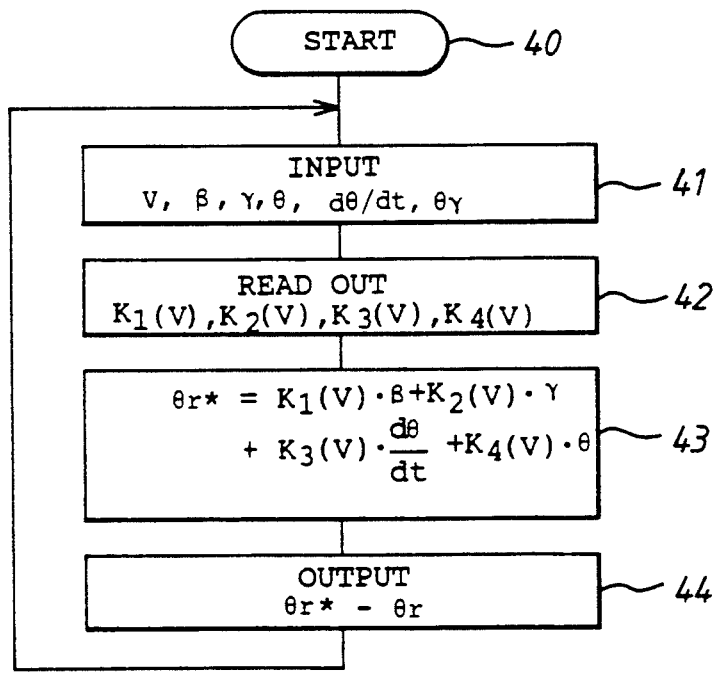
FIG. 3 is a flow chart of a control program executed by a microcomputer shown in FIG. 1.
Figure 4:
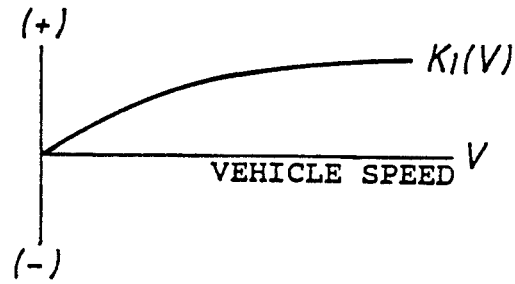
FIGS. 4(A)-(D) illustrate coefficients $K_1(V)$-$K_4(V)$ in relation to the vehicle speed, respectively.
Figure 4:
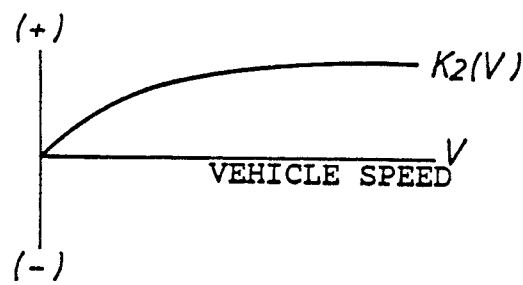
Figure 4:
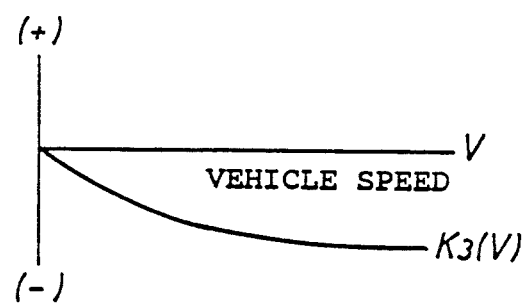
Figure 4:
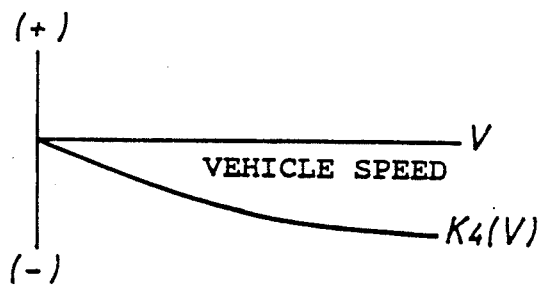

Hereinafter, operation of the microcomputer 37 will be described in detail with reference to the flow chart shown in FIG. 3. Assuming that an ignition switch (not shown) of the vehicle has been turned on, the computer 37 initiates execution of the control program at step 40 to repetitively execute processing at step 41-44 for controlling steerage of the rear road wheels RW1, RW2. At step 41 of the program, the computer 37 is applied with electric signals respectively indicative of instant vehicle speed V, slip angle $\beta$, yaw rate $\gamma$, roll angle speed $d\theta/dt$, roll angle $\theta$ and rear wheel steering angle $\theta\gamma$ from sensors 31-36 and causes the program to proceed to step 42. At step 42, the computer 37 reads out the coefficients $K_1(V)$, $K_2(V)$, $K_3(V)$ and $K_4(V)$ related to the instant vehicle speed V from the tables shown in FIG. 4. At the following step 43, the computer 37 calculates a target rear wheel steering angle $\theta\gamma^*$ based on the coefficients $K_1(V)$, $K_2(V)$, $K_3(V)$, $K_4(V)$ and the instant slip angle $\beta$, yaw rate $\gamma$, roll angle speed $d\theta/dt$ and roll angle $\theta$ by execution of the following equation.

$$\theta\gamma^* = K_1(V)\cdot\beta + K_2(V)\cdot\gamma + K_3(V)\cdot d\theta/dt + K_4(V)\cdot\theta$$

Subsequently, the computer 37 calculates at step 44 a difference $\theta\gamma^* - \theta\gamma$ between the target rear wheel steering angle and the instant rear wheel steering angle to produce a control signal indicative of the difference $\theta\gamma^* - \theta\gamma$ for control of the rear road wheels RW1, RW2.

When applied with the control signal from the computer 37, the driving circuit 38 activates the actuator 21 in such a manner as to effect axial displacement of the relay rod 22 in an amount corresponding to the calculated difference $\theta\gamma^* - \theta\gamma$. Thus, the rear road wheels RW1, RW2 are steered leftward or rightward at an angle corresponding to the calculated difference $\theta\gamma^* - \theta\gamma$ so that the instant steering angle $\theta\gamma$ of the rear road wheels coincides with the target steering angle $\theta\gamma^*$.

Figure 5:
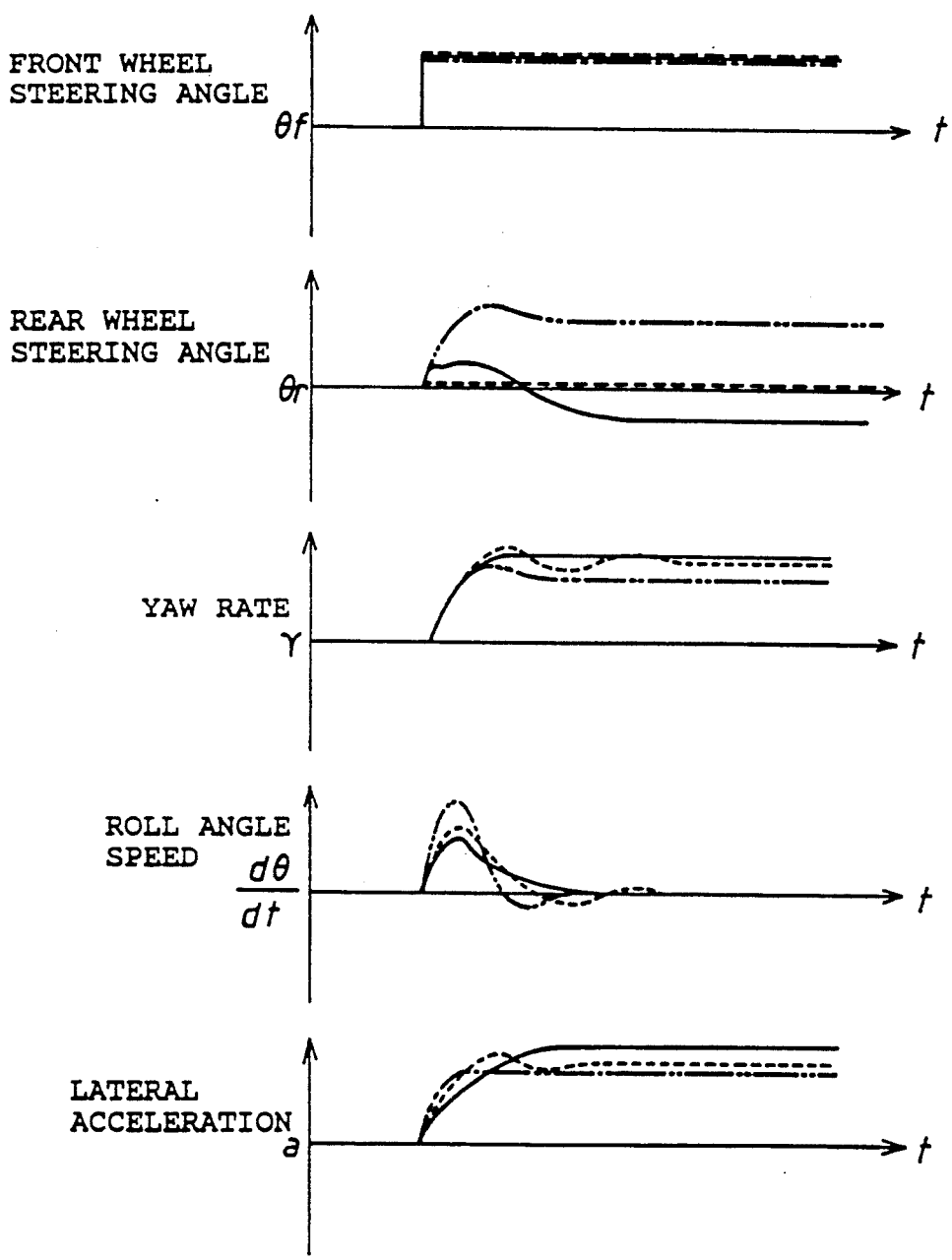
FIG. 5 illustrates each condition amount of the wheeled vehicle in relation to a lapse of time in contrast with the conventional electric control apparatus.
Figure 6:
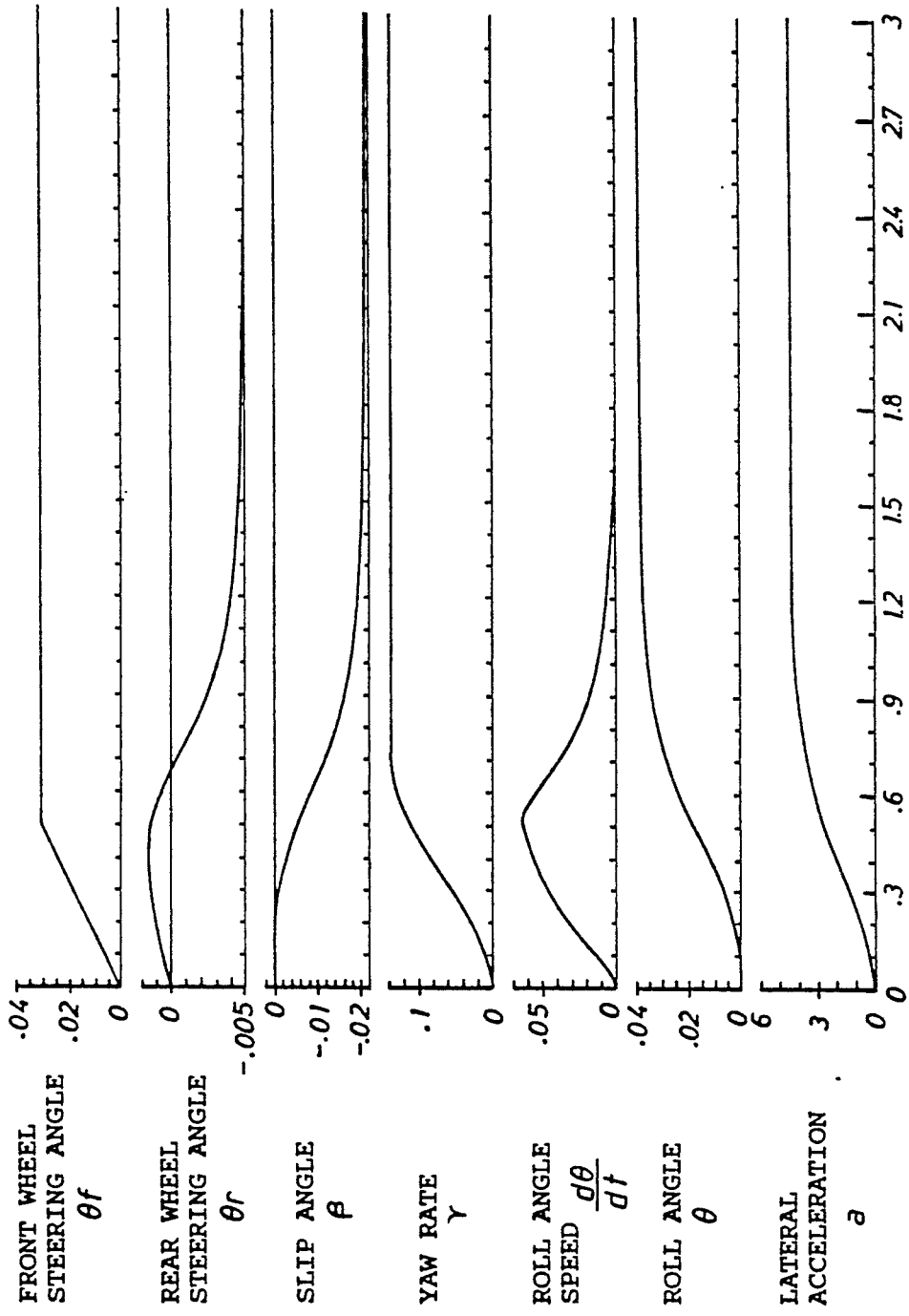
FIG. 6 illustrates each condition amount of the wheeled vehicle in relation to a lapse of time under control of the present invention.

Assuming that the front road wheels FW1, FW2 have been steered during travel of the vehicle to cause a slip angle $\beta$ and a yaw rate $\gamma$ on the vehicle body, each absolute value of the coefficients $K_1(V)$, $K_2(V)$ is increased as a positive value in accordance with increase of the vehicle speed V as shown in FIGS. 4(A) and (B). For this reason, the rear road wheels RW1, RW2 are steered on a basis of the value of $K_1(V)\cdot\beta$ and $K_2(V)\cdot\gamma$ in a direction restraining the slip angle $\beta$ and yaw rate $\gamma$ of the vehicle body or in the same direction as that of the front road wheels FW1, FW2. Thus, as shown by solid lines in FIG. 5 and in FIG. 6, convergency of the slip angle $\beta$ and yaw rate $\gamma$ can be improved to enhance the running stability of the vehicle. In such steering operation of the vehicle, the vehicle body is rolled outwardly to cause a roll angle speed $d\theta/dt$ and roll angle $\theta$. Since each of the coefficients $K_3(V)$, $K_4(V)$ is increased as a negative value in accordance with increase of the vehicle speed V as shown in FIGS. 4(C) and (D), the rear road wheels RW1, RW2 are steered on a basis of the value of $K_3(V)\cdot d\theta/dt$ and $K_4(V)\cdot\theta$ in a direction restraining the roll of the vehicle body or in the opposite direction relative to the front road wheels FW1, FW2. As a result, the rear road wheels RW1, RW2 are steered first in the same phase as the front road wheels FW1, FW2 and then steered in the opposite phase relative to the front road wheels FW1, FW2 to slacken a rise rate of lateral acceleration a of the vehicle body without causing any deterioration of the yaw rate convergency. This is effective to restrain the roll angle speed $d\theta/dt$ in a small value as shown by the solid line in FIG. 5 and in FIG. 6 to enhance the riding comfort of the vehicle without causing any deterioration of the running stability.

Although in the above embodiment the roll angle speed sensor 34 and roll angle sensor 35 are separately provided to detect the roll angle speed $d\theta/dt$ and the roll angle $\theta$, only the roll angle speed sensor 34 may be adapted to detect the roll angle speed $d\theta/dt$ and to calculate the roll angle $\theta$ by integration of the detected roll angle. Alternatively, only the roll angle sensor 35 may be adapted to detect the roll angle $\theta$ and to calculate the roll angle speed $d\theta/dt$ by differentiation of the detected roll angle. In addition, the yaw rate $\gamma$ and slip angle $\beta$ may be presumed on a basis of the other detection values under assumption of a movement model of the vehicle. For example, the slip angle $\beta$ of the vehicle body may be calculated on a basis of the lateral acceleration a, vehicle speed V and yaw rate $\gamma$ by execution of the following equation.

$$\beta = (a/V) - \gamma.$$

What is claimed is:
1. An electric control apparatus for a rear wheel steering mechanism in a four-wheel steering system of a wheeled vehicle, said rear wheel steering mechanism having an electrically operated actuator arranged to steer a set of dirigible rear road wheels in response to an electric control signal applied thereto, the electric control apparatus comprising:
   detection means for detecting a yaw rate of a vehicle body,
   means for determining a target steering amount in accordance with a magnitude of the detected yaw rate for steering the rear road wheels in a direction restraining the yaw rate of the vehicle body, means for producing a control signal indicative of the target steering amount and applying the control signal to said electrically operated actuator, means for detecting a roll angle of the vehicle body, and correction means for correcting the target steering amount in accordance with a magnitude of the detected roll angle to steer the rear road wheels in an opposite direction relative to the direction restraining the yaw rate of the vehicle body.

2. An electric control apparatus for a rear wheel steering mechanism in a four-wheel steering system of a wheeled vehicle, said rear wheel steering mechanism having an electrically operated actuator arranged to steer a set of dirigible rear road wheels in response to an electric control signal applied thereto, the electric control apparatus comprising:

detection means for detecting a yaw rate of a vehicle body, means for determining a target steering amount in accordance with a magnitude of the detected yaw rate for steering the rear road wheels in a direction restraining the yaw rate of the vehicle body, means for producing a control signal indicative of the target steering amount and for applying the control signal to said electrically operated actuator, means for detecting a roll angle speed of the vehicle body, and correction means for correcting the target steering amount in accordance with a magnitude of the detected roll angle speed to steer the rear road wheels in an opposite direction relative to the direction restraining the yaw rate of the vehicle body.

3. An electric control apparatus for a rear wheel steering mechanism in a four-wheel steering system of a wheeled vehicle, said rear wheel steering mechanism having an electrically operated actuator arranged to steer a set of dirigible rear road wheels in response to an electric control signal applied thereto, the electric control apparatus comprising:

a vehicle speed sensor for detecting a travel speed of the vehicle;

a slip angle sensor for detecting a slip angle of the vehicle;

a yaw rate sensor for detecting a yaw rate of the vehicle;

a roll angle sensor for detecting a roll angle of the vehicle;

a roll angle speed sensor for detecting a roll angle speed of the vehicle;

a steering angle sensor for detecting a steering angle of the rear road wheels;

memory means for memorizing first, second, third and fourth coefficients in relation to an actual travel speed of the vehicle, the first and second coefficients are defined to increase in accordance with an increase of the actual speed of the vehicle while the third and fourth coefficients are defined to decrease in accordance with an increase of the actual speed of the vehicle;

means for reading out the memorized coefficients related to the detected actual travel speed of the vehicle and for calculating a target steering angle of the rear road wheels based on each value of the detected slip angle and yaw rate respectively multiplied with the first and second coefficients and each value of the detected roll angle and roll angle speed respectively multiplied with the third and fourth coefficients; and means for producing a control signal indicative of a difference between the target steering angle and the detected actual steering angle of the rear road wheels and applying the control signal to said electrically operated actuator.

* * * * *